G. A. PEARSE, Jr.
PACKING FOR PISTONS AND THE LIKE.
APPLICATION FILED MAR. 29, 1909.
951,333.
Patented Mar. 8, 1910.
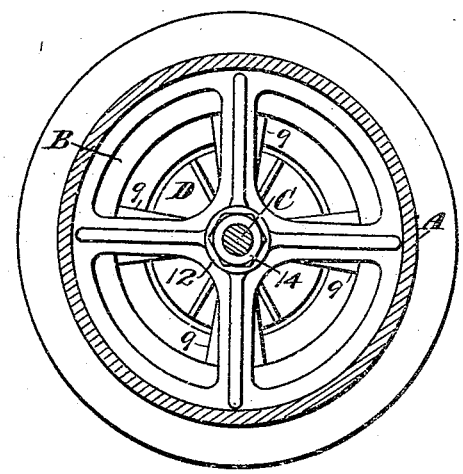
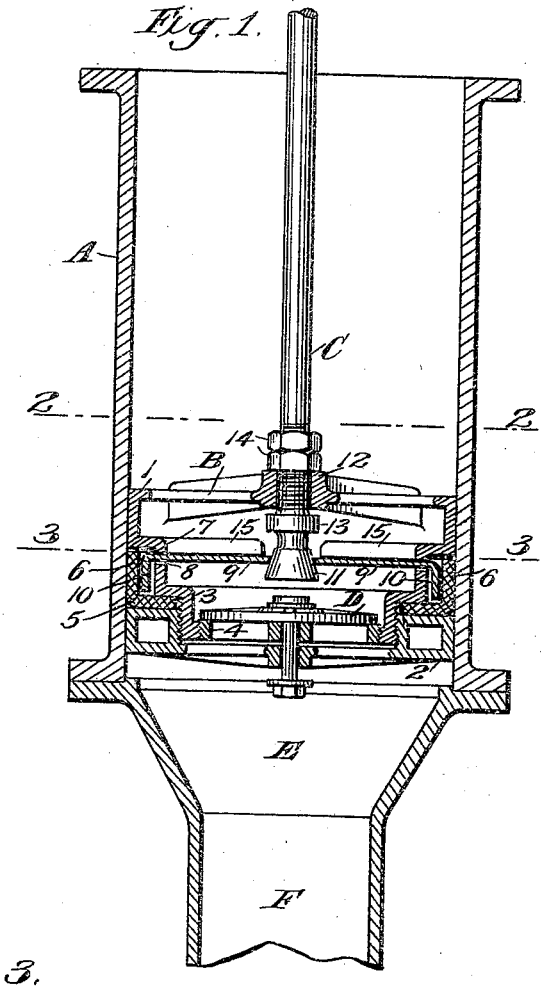
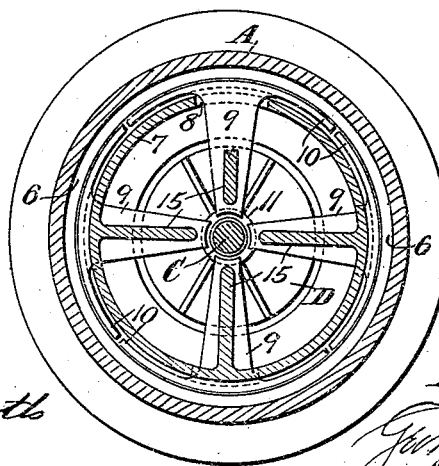
Witnesses:
George H. Botts
J. A. Graves
Inventor:
George A. Pearse Jr.

UNITED STATES PATENT OFFICE.

GEORGE A. PEARSE, JR., OF NEW YORK, N. Y.

PACKING FOR PISTONS AND THE LIKE.

951,333.  Specification of Letters Patent.  Patented Mar. 8, 1910.

Application filed March 29, 1909. Serial No. 486,424.

*To all whom it may concern:*

Be it known that I, GEORGE A. PEARSE, Jr., a citizen of the United States, residing at New York city, county of New York, and State of New York, have invented certain new and useful Improvements in Packing for Pistons and the Like, fully described and represented in the following specification and the accompanying drawings, forming a part of the same.

This invention relates to a plunger or piston packing whereby the wear or shrinkage of the packing is compensated for and a tight fit insured between the packing and the inner side of the cylinder, thereby preventing leakage of fluid between the sides of the plunger and cylinder.

The invention is shown in the drawings as applied to the plunger of a pump cylinder, but it will be understood that it may be readily applied to steam or water pistons.

In the drawings forming a part of this specification,—Figure 1 is a vertical section of a part of a pump cylinder. Fig. 2 is a horizontal section taken on the line 2—2 of Fig. 1, showing a plan view of the plunger. Fig. 3 is a section taken on the line 3—3 of Fig. 1, and showing the means for expanding or forcing the packing against the side of the cylinder.

Referring to Fig. 1, A indicates the pump cylinder, and B the pump plunger or piston, as the case may be, C the plunger rod, D the inlet valve, and E the induction or suction chamber and F the supply pipe.

While the construction of the plunger D may be of any desired form, I have shown it as composed of two parts 1, 2, the upper part 1 being provided with an extension 3 threaded on to the part 2 of the plunger. This extension 3 is provided with the usual valve seat 4 of the inlet valve D as is common to this form of pump. Between the upper and lower parts 1, 2 of the plunger B is secured the flat portion of the cup-shaped packing 5, the packing ring 6 of the packing resting against the inner wall of the cylinder A. The part 1 of the plunger B has a central wall 7 somewhat smaller in diameter than the packing ring 6 of the packing 5, this extension 7 being provided with slots 8 through which are passed arms 9. These arms 9, of which there are four, as shown in the drawings, although it will be understood that any desired number may be used, are provided with plates 10, each of which, as shown in the drawing, extends around about one fourth of the inner periphery of the packing ring 6. The arms 9 are supported and guided at their outer ends by the wall 7 of the piston, and at their inner ends by a cone-shaped block 11 forming a part of or secured to the lower end of the plunger rod C. The part 1 of the plunger B is provided with a hub 12 through which passes the plunger rod C, the plunger rod being provided above the hub 12 with adjusting nuts 14.

The operation of the parts, as described, and shown, is as follows: As the plunger rod moves block 11 engages the inner ends of the arms 9 and forces them outwardly, the plates 10 impinging against and forcing the packing ring 6 against the inner wall of the cylinder A and preventing any leakage of air into the suction chamber E, so that a high vacuum may be formed in the said chamber and the maximum amount of water drawn in to the cylinder. When the arms 9 have been moved outward sufficiently to take up any looseness of the packing ring 6, the collar 13 of the plunger rod C engages the hub 12 and the plunger is moved upward to draw the water into the cylinder. The plunger rod C then makes its down stroke, the nuts 14 engaging the upper side of the hub 12 moving the plunger down forcing the water upwardly through the valve D into the cylinder over the plunger, an inlet valve (not shown) in the pipe F being closed at this time. The movement of the plunger rod to secure the desired outward movement of the plates 10 is very small and the distance away from the hub 12 of the collar 13 is regulated by the adjusting nuts 14 so that the collar 13 will strike the hub 12 immediately after the packing ring 6 has been forced tightly against the inner wall of the cylinder. To prevent the arms 9 from being bent upward and away from the block 11 when the plunger makes its down stroke, ribs 15 are provided, these ribs extending from the wall 7 inwardly and over the arms 9, as shown in Figs. 1 and 4.

While I have described and shown, what I consider to be the preferred form of my invention it will be understood that the construction of the parts may be widely varied without departing from my invention.

What I claim is:—

1. A plunger or piston provided with a packing ring and means whereby the packing ring is pressed against the inner surface of the cylinder by the plunger or piston rod at or before the beginning of the movement of said plunger or piston, substantially as described.

2. The combination with a plunger or piston provided with a packing ring, of a plurality of movable plates for engaging the inner surface of the packing ring, and a plunger or piston rod adapted to move the said plates outwardly so as to press the packing ring against the inner surface of the cylinder at or before the beginning of the movement of the plunger or piston, substantially as described.

3. The combination with a plunger or piston provided with a packing ring, of a plurality of radially movable plates, and a piston rod provided with a hub or block for engaging the inner ends of said movable plates whereby the outer ends of the said plates are forced into engagement with the packing ring to press the packing ring against the inner surface of the cylinder at or before the beginning of the movement of the plunger or piston on the suction stroke, substantially as described.

4. In a plunger or piston provided with a packing ring, the combination of a plurality of movable plates having inwardly extending arms, of a plunger or piston rod provided with a cone-shaped block for moving the said plates outwardly, of a collar secured to the plunger or piston rod, and adjusting nuts threaded on the plunger or piston rod, whereby the outward movement of the plates is determined, substantially as described.

5. In a plunger or piston comprising sections provided with a packing ring secured between the said sections, of a plurality of outwardly movable plates having inwardly extending arms, of inwardly extending ribs secured to the plunger or piston, a plunger or piston rod provided with a cone-shaped block for moving the said plates outwardly, of a collar secured to the plunger or piston rod, adjusting nuts threaded onto the plunger or piston rod, and an inlet valve mounted in said plunger or piston, substantially as described.

In testimony whereof, I have hereunto set my hand, in the presence of two subscribing witnesses.

GEORGE A. PEARSE, Jr.

Witnesses:
GEORGE H. BOTTS,
J. A. GRAVES.